(12) United States Patent
Ahn

(10) Patent No.: US 9,407,737 B2
(45) Date of Patent: Aug. 2, 2016

(54) COMMUNICATION TERMINAL

(71) Applicant: ERICSSON-LG ENTERPRISE CO., LTD., Anyang-si Gyeonggi-do (KR)

(72) Inventor: Sang Moon Ahn, Gunpo-si (KR)

(73) Assignee: ERICSSON-LG ENTERPRISE CO., LTD., Anyang-Si, Gyeonggi-Do ( * ) Notice: Subject to any disclaimer, the term of this patent is extended or adjusted under 35 U.S.C. 154(b) by 0 days.

(21) Appl. No.: 14/796,377

(22) Filed: Jul. 10, 2015

(65) Prior Publication Data
US 2016/0094694 A1      Mar. 31, 2016

(30) Foreign Application Priority Data
Sep. 30, 2014   (KR) .......................... 10-2014-0130947

(51) Int. Cl.
| | | |
|---|---|---|
| H04M 1/00 | (2006.01) | |
| H04M 1/02 | (2006.01) | |
| F16M 11/20 | (2006.01) | |
| F16M 11/04 | (2006.01) | |
| F16M 11/18 | (2006.01) | |
| F16M 11/10 | (2006.01) | |
| G06F 1/16 | (2006.01) | |
| H04M 1/04 | (2006.01) | |

(52) U.S. Cl.
CPC .......... *H04M 1/0237* (2013.01); *F16M 11/041* (2013.01); *F16M 11/10* (2013.01); *F16M 11/18* (2013.01); *F16M 11/2021* (2013.01); *G06F 1/1632* (2013.01); *H04M 1/0254* (2013.01); *H04M 1/04* (2013.01)

(58) Field of Classification Search
CPC ... H04M 1/0237; H04M 1/0254; H04M 1/04; F16M 11/2021; F16M 11/041; F16M 11/18; F16M 11/10; G06F 1/1632

USPC ................ 455/575.4; 248/125.7, 157, 125.1, 248/125.8, 125.9
See application file for complete search history.

(56) References Cited

U.S. PATENT DOCUMENTS

| | | | |
|---|---|---|---|
| 5,661,798 A | 8/1997 | Chen | |
| 7,448,580 B2 * | 11/2008 | Shimizu | ................. F16M 11/06 248/176.3 |
| 2003/0075649 A1 * | 4/2003 | Jeong | ................... F16M 11/105 248/157 |
| 2005/0205725 A1 * | 9/2005 | Yokouchi | ............... F16M 11/24 248/125.1 |
| 2013/0075543 A1 | 3/2013 | Krohn et al. | |
| 2015/0182196 A1 * | 7/2015 | Ninomiya | ............ A61B 8/4427 600/437 |

FOREIGN PATENT DOCUMENTS

| | | |
|---|---|---|
| GB | 2 455 842 A | 6/2009 |
| KR | 10-2009-0037659 A | 4/2009 |

OTHER PUBLICATIONS

European Search Report Issued in Application No. 15175796.0 dated Mar. 8, 2016.

* cited by examiner

*Primary Examiner* — Khai M Nguyen
(74) *Attorney, Agent, or Firm* — Ked & Associates, LLP

(57) ABSTRACT

A communication terminal, a terminal body of which is fixed at various tilting angles, is disclosed. The communication terminal has a terminal body, a slider detachably coupled to the terminal body, and a stand coupled to the slider which is slidably moved to and from the stand. The stand supports the terminal body by the slider. The slider has a plurality of engagement portions arranged in a longitudinal direction of the slider. A rotation lever disposed in the stand releasably engages one of the engagement portions. The rotation lever is biased by a spring to releasably engage the engagement portions.

13 Claims, 14 Drawing Sheets

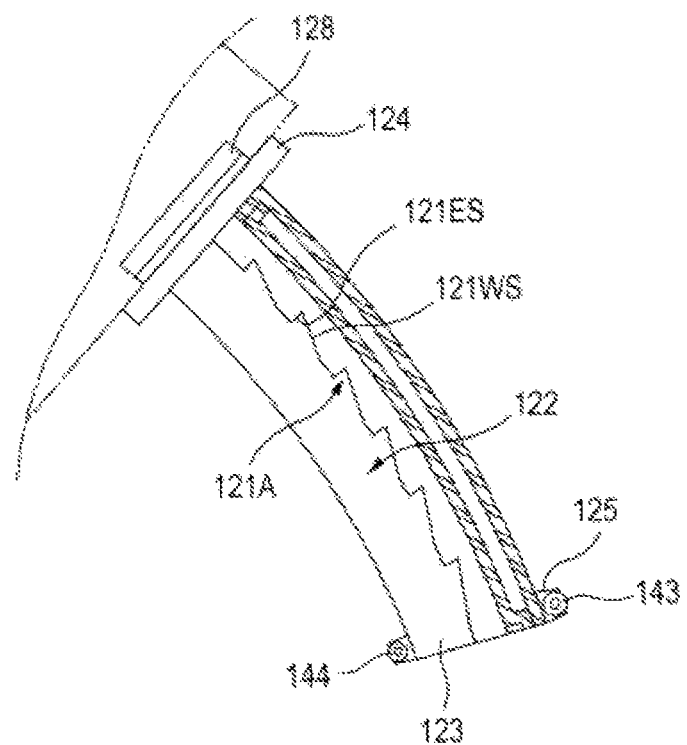

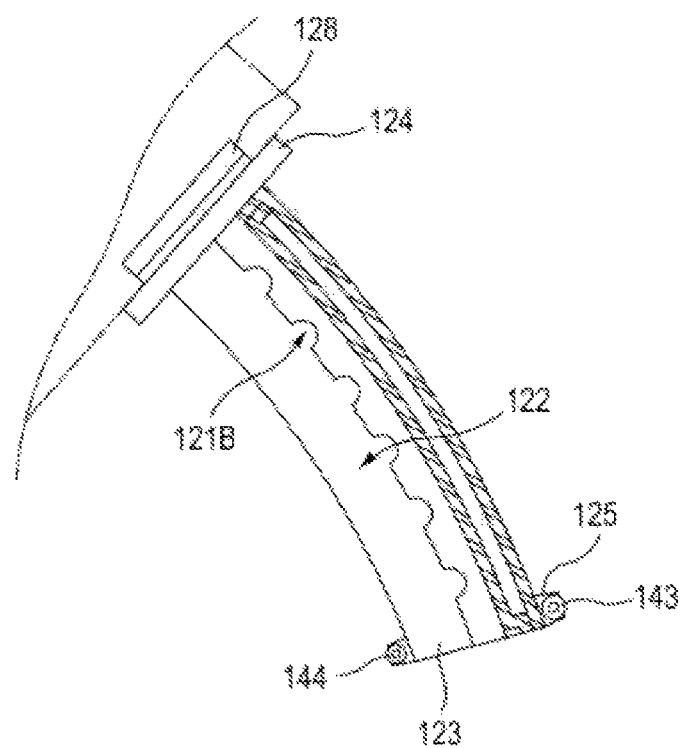

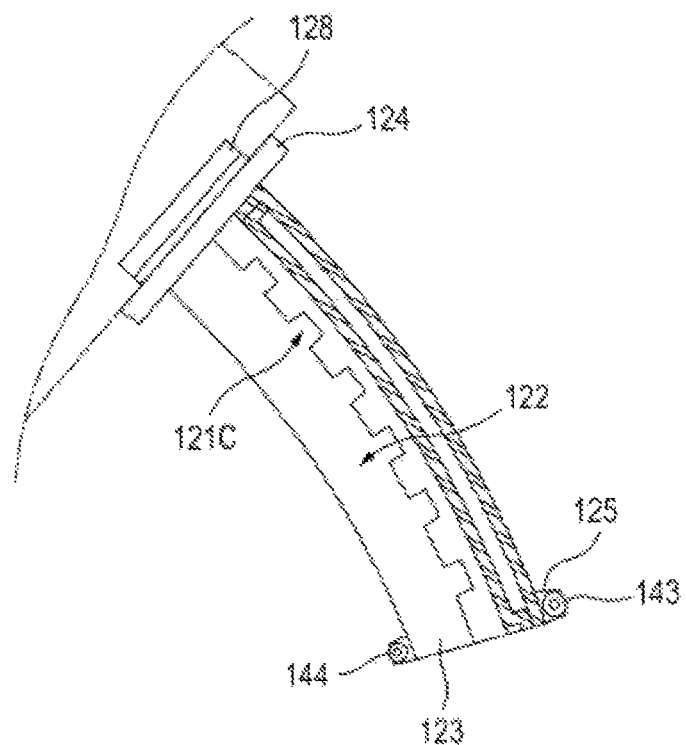

COMMUNICATION TERMINAL

CROSS-REFERENCE TO RELATED APPLICATION

The present application claims priority from Korean Patent Application No. 10-2014-0130947 filed on Sep. 30, 2014, the entire subject matter of which is incorporated herein by reference.

TECHNICAL FIELD

The present disclosure relates to a communication terminal including a terminal body which is fixed at various tilting angles.

BACKGROUND

A communication terminal including a terminal body, in which a tilting angle of the terminal body can be adjusted, is known in the art. For example, Korean Patent Application Publication No. 10-2009-0037659 proposes an example of a communication terminal including a terminal body in which a tilting angle of the terminal body can be adjusted by manipulating a lever provided in the terminal body. According to the communication terminal proposed by the aforementioned document, a user must manually adjust the tilting angle of the terminal body while manipulating the lever of the terminal body. Further, in the communication terminal proposed by the aforementioned document, a structure for supporting the terminal body fails to stably fix the terminal body when the force is applied to the terminal body, thus causing the terminal body to sway. As such, in related art, the communication terminal causes inconvenience to a user when using the communication terminal and cannot stably fix the terminal body.

SUMMARY

The present disclosure includes various embodiments, one or more being directed to a communication terminal configured to adjust a tilting angle of a terminal body.

According to one embodiment of the present disclosure, there is provided a communication terminal including a terminal body, a slider and a stand. The slider is detachably coupled to a rear surface of the terminal body and is slidably coupled to the stand. The stand supports the terminal body by the slider. The slider includes a plurality of engagement portions arranged in a longitudinal direction of the slider. The communication terminal includes a rotation lever rotatably coupled to the stand, and a spring coupled to the stand and the rotation lever. The rotation lever includes a pawl releasably engaging one of the engagement portions of the slider. The spring biases the rotation lever toward the slider such that the pawl of the rotation lever engages one of the engagement portions.

This Summary is provided to introduce a selection of concepts in a simplified form that are further described below in the detailed description. This Summary is not intended to identify key or essential features of the claimed subject matter, nor is it intended to be used in determining the scope of the claimed subject matter.

BRIEF DESCRIPTION OF THE DRAWINGS

FIGS. 6A to 6C are sectional views of the slider, showing various examples of engagement portions respectively;

DETAILED DESCRIPTION

Figure 1:
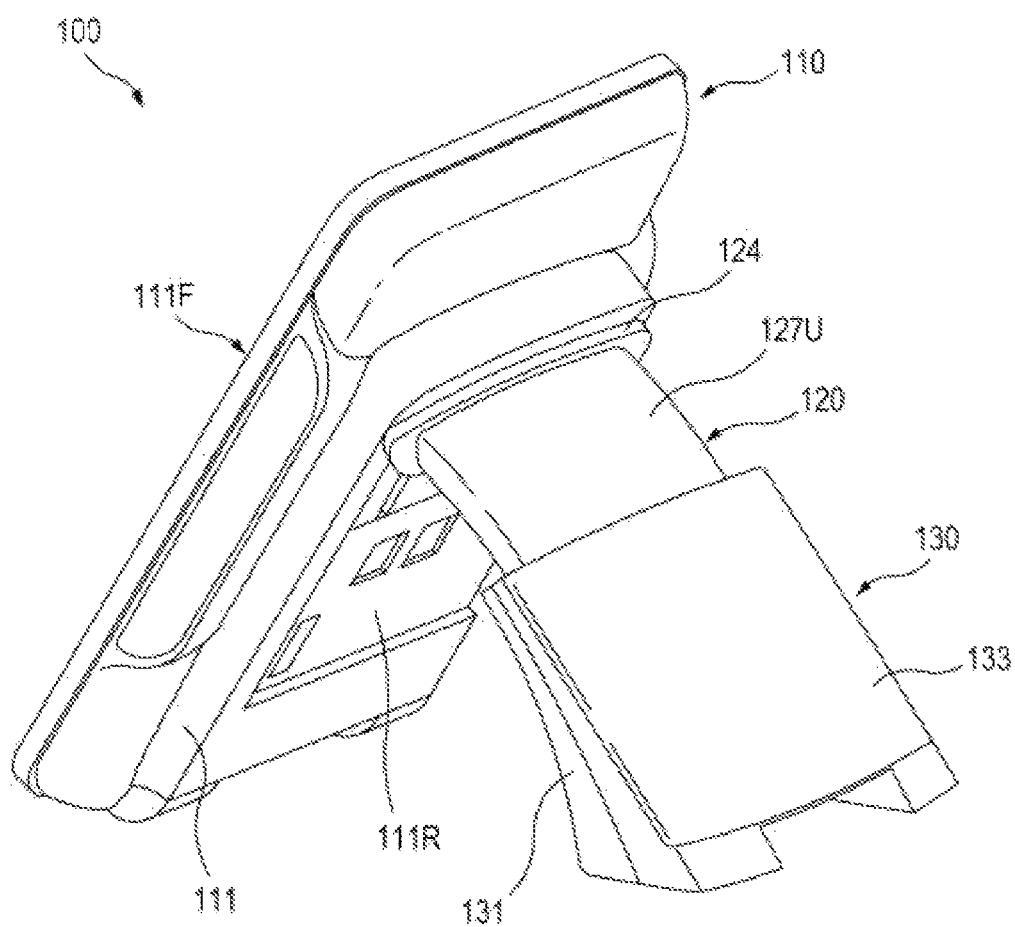
FIG. 1 is a perspective view showing a communication terminal according to an embodiment.
Figure 2:
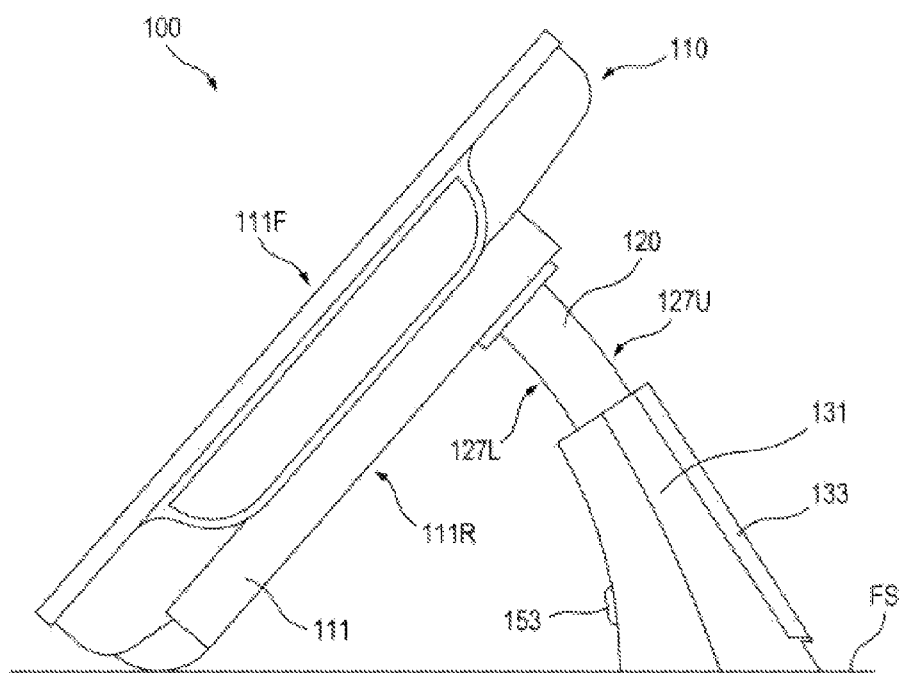
FIG. 2 is a side view of the communication terminal shown in FIG. 1.

This detailed description is provided with reference to the accompanying drawings. One of ordinary skill in the art may realize that the following description is illustrative only and is not any way limiting. Other embodiments of the present disclosure may readily suggest themselves to such skilled persons having the benefit of this disclosure.

Referring to FIGS. 1 to 7, a communication terminal 100 according to an embodiment comprises a terminal body 110, a slider 120 extending from the terminal body 110, and a stand 130 configured to receive the slider 120. The slider 120 can be slid and moved, and is coupled to the stand 130. The stand 130 supports the terminal body 110 by the slider 120 in a state where the terminal body 110 is tilted. The terminal body 110 of the communication terminal 100 is supported by the stand 130 at stepped tilting angles. For the stepped adjustment of the tilting angles of the terminal body 110, the communication terminal 100 is configured such that the slider 120 is locked by the stand 130 according to each of the stepped tilting angles. For locking the slider 120 of the communication terminal 100, the slider 120 is provided with a plurality of engagement portions 121 arranged in a longitudinal direction of the slider 120. Further, the communication terminal 100 comprises a rotation lever 150, which is located in the stand 130 and is configured to engage one of the engagement portions 121 of the slider 120, and a spring 160, which is configured to bias the rotation lever 150 toward the slider 120 such that the rotation lever 150 engages the engagement portions 121 of the slider 120.

The terminal body 110 includes a terminal housing 111 which includes various types of electrical parts needed for transmission and reception therein. The terminal body 110 has a display device, key buttons for inputting telephone numbers, key buttons needed for transmission and reception, etc. (not shown) on a front surface 111F of the terminal housing 111. Further, the communication terminal 100 may have a handset (not shown) on the terminal housing 111 of the terminal body 110, and the handset may be connected to the terminal body 110 wiredly or wirelessly. Further, the terminal body 110 of the communication terminal 100 may include a laptop computer having a wireless communication function, a tablet computer, and a mobile phone.

The stand 130 is placed on a floor surface FS and is spaced apart from a rear surface 111R of the terminal housing 111. The floor surface FS includes a top surface of any table, a ground surface or the like. The stand 130 supports the terminal body 110 with respect to the floor surface FS. While the communication terminal 100 of this embodiment includes the stand 130 separated from the terminal housing 111 of the terminal body 110 as shown in FIG. 1, the communication terminal 100 should not be limited thereto. Although not shown in the figures, a communication terminal according to some embodiments may be configured such that the stand is integrated with or coupled to a part extending rearward from the terminal housing 111. Further, a communication terminal according to some other embodiment may be configured such that the terminal housing 111 and the stand 130 are integrated together by coupling a lower portion of the terminal housing 111 to a lower portion of the stand 130 by means of a plate-shaped part (not shown).

The stand 130 is hollow and has a shape of a rectangular pillar that is inclined with respect to the floor surface FS. The stand 130 has a receiving space 130RS adapted to receive a portion of the slider 120. Thus, the stand 130 includes an inner upper surface (not shown) facing an upper surface 127U of the slider 120, and an inner lower surface (not shown) facing a lower surface 127L of the slider 120. In this embodiment, the stand 130 includes the following: a stand housing 131; a slider cover 132 detachably coupled to the stand housing 131 and guiding a movement of the slider 120; and a stand cover 133 detachably coupled to the stand housing 131 to secure the slider cover 132 to the stand housing 131. The receiving space 130RS, which receives at least a portion of the slider 120 and allows a sliding movement of the slider 120, is defined between the stand housing 131 and the slider cover 132. Further, in this embodiment, the aforementioned inner upper surface of the stand 130 comprises a lower surface of the slider cover 132, while the aforementioned inner lower surface of the stand 130 comprises an inner surface of the stand housing 131.

The stand housing 131 has a bottom portion 131B, a top portion 131T longitudinally opposite to the bottom portion 131B, and a front portion 131F and side portions 131L extending between the top portion 131T and the bottom portion 131B. The bottom portion 131B is placed into contact with the floor surface FS. The slider 120 is moved into and out of the stand 130 through the top portion 131T. The bottom portion 131B has an area greater than that of the top portion 131T so that the stand 130 can stably support the terminal body 110. The stand housing 131 may have a part for increasing friction such as a silicone rubber-made bottom plate at the bottom portion 131B so that the stand 130 can be fixed on the floor surface FS. Further, the front portion 131F and the side portions 131L obliquely extend upward with respect to the bottom portion 131B. Further, the top portion 131T is obliquely inclined upward with respect to the bottom portion 131B in a direction opposite to the oblique upward direction of the front portion 131F and the side portions 131L. The inner surface of the stand housing 131 includes a slide surface which comes into contact with the lower surface 127L of the slider 120 (in this embodiment, surfaces of rails 123 of the slider 120). By way of example of such slide surfaces, arcuate slant surfaces 131I are formed in the side portions 131L of the stand housing 131. The arcuate slant surfaces 131I come into contact with the surfaces of the rails 123 of the slider 120. The stand housing 131 has a pair of notches 131N in the top portion 131T. A portion of the slider 120 (in this embodiment, the rails 123 of the slider 120) is positioned in the notches 131N. Further, the stand housing 131 has a tongue 131U formed between the notches 131N. The tongue 131U has a height less than a depth of the notches 131N and is positioned in a longitudinal groove 122 of the slider 120. Further, the stand 130 has an opening 134 perforated in the front portion 131F of the stand housing 131 at a lower portion of the front portion 131F. A push button 153 of the rotation lever 150 is disposed in the opening 134 such that it can be moved into and out of the stand housing 131.

Figure 4:
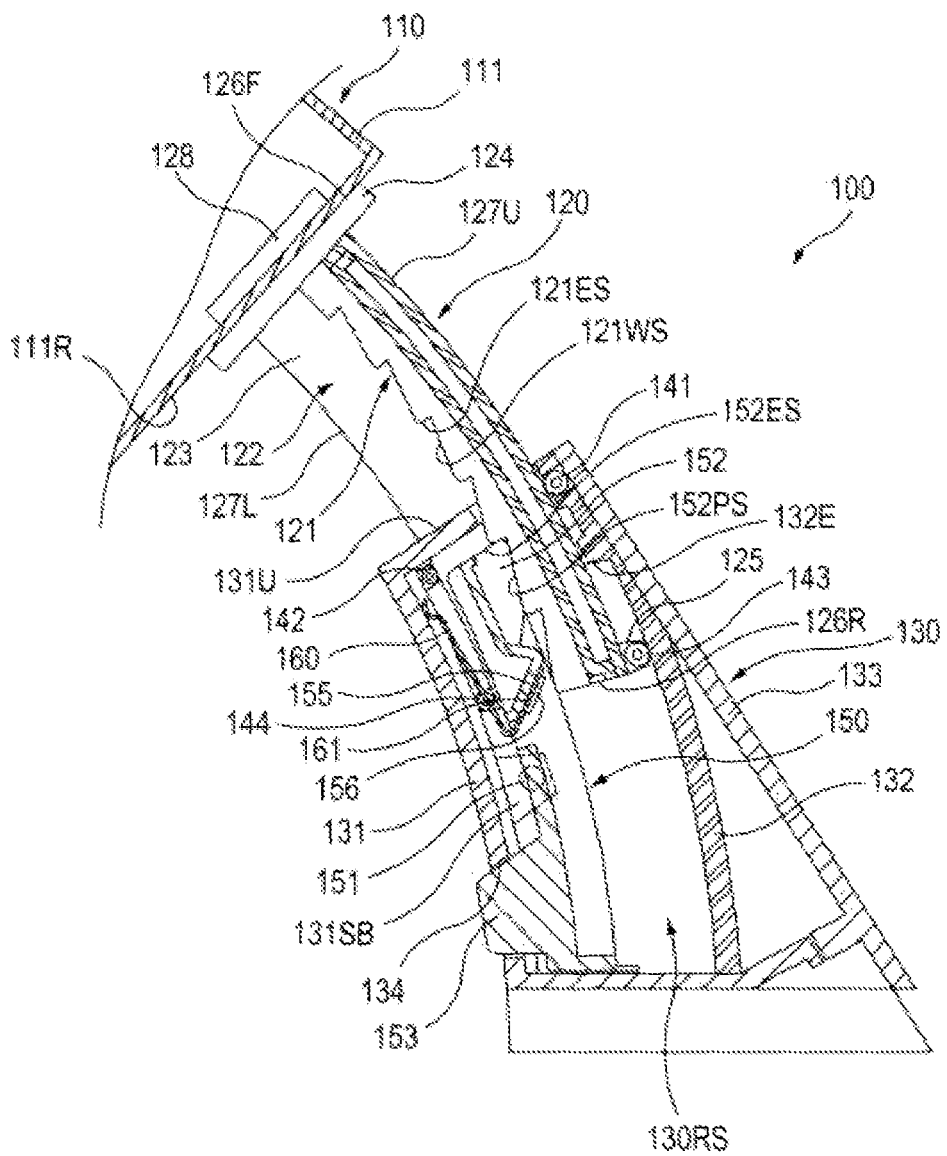
FIG. 4 is a sectional view showing a housing, a slider and a stand of the communication terminal shown in FIG. 1.

The slider 120 extends rearward from the rear surface 111R of the terminal housing 111 of the terminal body 110. The slider 120 is detachably coupled to the rear surface 111R of the terminal housing 111 and has a shape of a thin and wide bar. That is, the slider 120 has a fixed end 126F, which is one end of the slider 120 in the longitudinal direction of the slider 120 and is fixed to the terminal housing 111 of the terminal body 110, and a free end 126R, which is the opposite end of the slider 120 and is located opposite the fixed end 126F. A portion of the slider 120 is inserted to the stand 130. Further, the slider 120 is coupled to the stand 130 such that the slider 120 may be slidably moved out of the stand 130 or slidably moved into the stand 130. To limit the movement of the slider 120, the slider 120 has a flange 124 and stoppers 125. The flange 124 is adjacent to the fixed end 126F of the slider 120. The flange 124 comes into contact with the top portion 131T of the stand housing 131 to limit the movement of the slider 120 in the moving-in direction (e.g., a direction indicated by an arrow TD in FIG. 8), thereby preventing the slider 120 from being completely inserted into the stand 130. The stoppers 125 are located on the upper surface 127U of the slider 120 adjacent to the free end 126R of the slider 120. The stoppers 125 are formed in a shape of a fin. The stoppers 125 limit the sliding movement of the slider 120 in the moving-out direction (e.g., a direction indicated by an arrow TU in FIG. 8). The stoppers 125 come into contact with a catching portion 132E of the slider cover 132. The slider 120 includes, at the fixed end 126F, a pair of hooks 128 extending frontward from the flange 124. As shown in FIG. 4, the hooks 128 are detachably coupled to the terminal housing 111 through slits (not shown) provided in the rear surface 111R of the terminal housing 111 and therefore the slider 120 is coupled to the terminal housing 111. Due to the stoppers 125 of the slider 120, the slider 120 is not separated from the stand 130. Accordingly, the stand 130 to which the slider 120 is slidably coupled may be provided as a kind of an assembly. Further, since the slider 120 is detachably coupled to the terminal body 110, such an assembly may be attached to any terminal body having a part for coupling to the slider 120, thereby accomplishing the adjustment of the tilting angle of such a terminal body.

Figure 3:
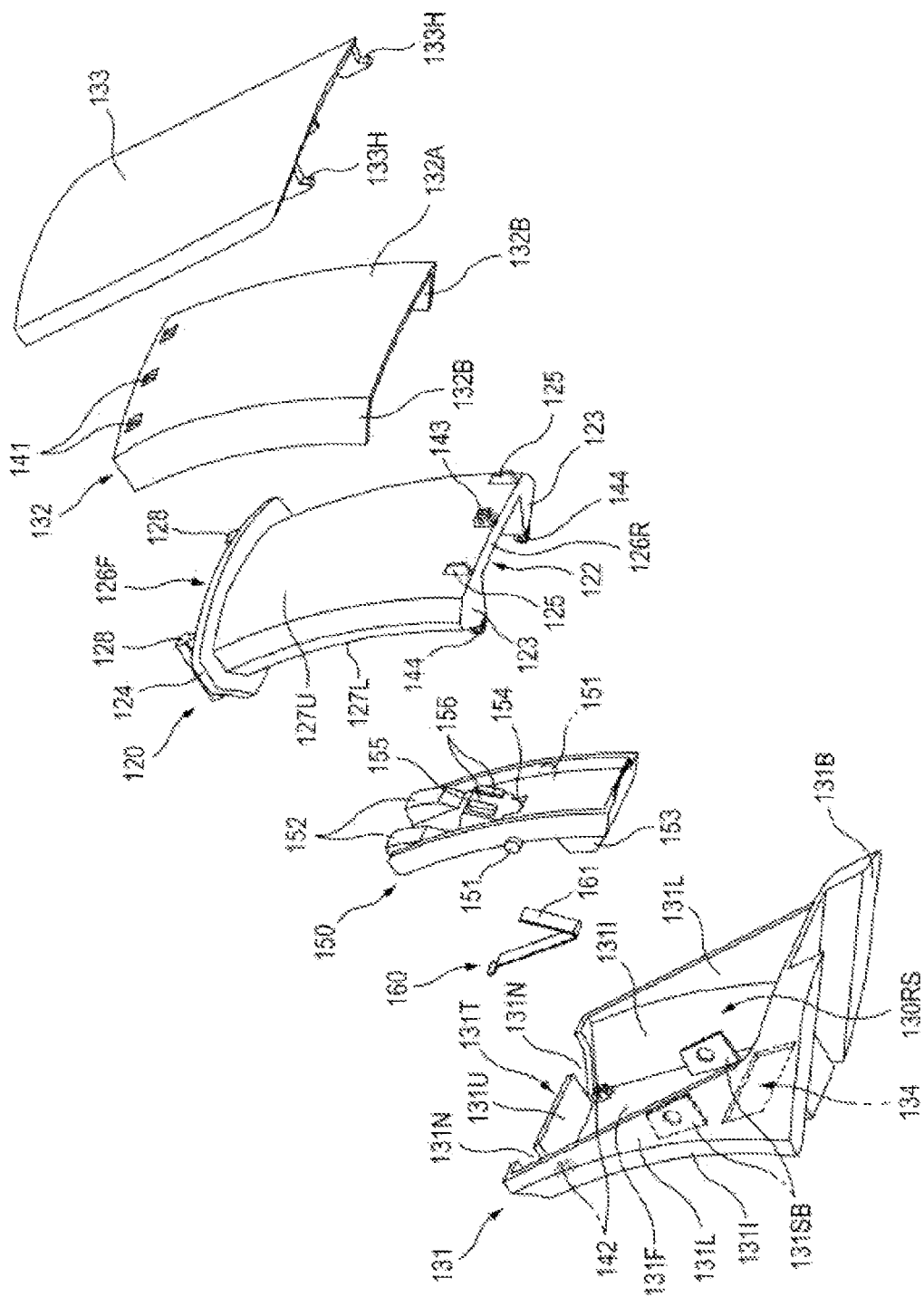
FIG. 3 is an exploded perspective view showing a slider and a stand of the communication terminal shown in FIG. 1.
Figure 5:
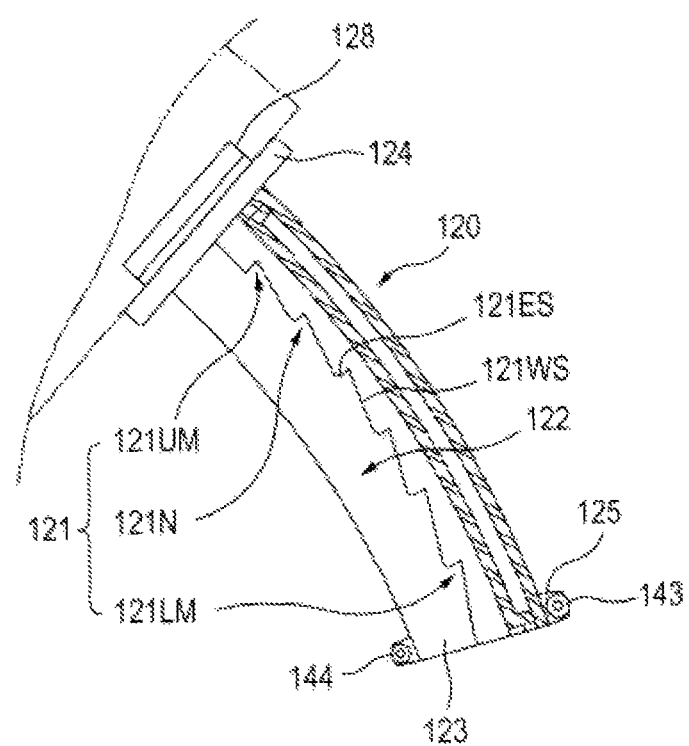
FIG. 5 is a sectional view of the slider shown in FIG. 4.

In this embodiment, as shown in FIGS. 3 to 5, the slider 120 is curved with a predetermined curvature in the longitudinal direction of the slider 120. That is, as shown in FIGS. 4 and 5, when the terminal body 110 is viewed from the side, the slider 120 is curved in a shape of a circular arc. Although not shown in the figures, a communication terminal according to some embodiments may have a linearly extending slider. A communication terminal according to some other embodiments may have a slider pivotally coupled to the rear surface 111R of the terminal housing 111. The slider 120 has a longitudinal groove 122, which extends from the fixed end 126F of the slider 120 to the free end 126R thereof, in the lower surface 127L of the slider 120. Therefore, the slider 120 has a pair of rails 123, which are located at respective side edges of the longitudinal groove 122 alongside the longitudinal groove 122, in the lower surface 127L of the slider 120. The longitudinal groove 122 is curved with approximately the same curvature as that of the slider 120. The rails 123 are positioned in the notches 131N of the stand 130.

The slider 120 includes a plurality of engagement portions 121 for the stepped adjustment of tilting angles of the terminal body 110. In this embodiment, the engagement portions 121 are formed in the longitudinal groove 122 and are arranged in the longitudinal direction of the slider 120. The plurality of engagement portions 121 are arranged consecutively in the longitudinal groove 122 in the longitudinal direction of the slider 120. The engagement portions 121 extend in a direction perpendicular to the longitudinal direction of the slider 120.

Each of the engagement portions 121 has an engagement surface 121ES and a wedge surface 121WS. The engagement surfaces 121ES and the wedge surfaces 121WS are alternately located in the arrangement of the plurality of engagement portions 121. When the terminal body 110 is viewed from the side, the wedge surface 121WS is longer than the engagement surface 121ES. The engagement surface 121ES is oriented toward the center of the radius of the curvature for the slider 120. In another embodiment, the wedge surface 121WS may have a length equal to or shorter than that of the engagement surface 121ES. In a further embodiment, as shown in FIG. 6A, a plurality of engagement portions 121A may be arranged at an equal spacing in the longitudinal direction of the slider 120. Further, in still further embodiments, engagement portions 121B may have a semicircular cross-sectional shape as shown in FIG. 6B, or engagement portions 121C may have a rectangular cross-sectional shape as shown in FIG. 6C. In the embodiments including the engagement portions shown in FIGS. 6B and 6C, pawls 152 of the rotation lever 150 may be shaped to correspond to the shapes of the engagement portions 121B, 128C.

The slider 120 interconnects the terminal body 110 and the stand 130 in such a manner that the slider 120 is coupled to the rear surface 111R of the terminal housing 111 at the fixed end 126F and a portion of the slider 120, which is located from the free end 126R to the fixed end 126F, is inserted to the receiving space 130RS of the stand 130. When said portion of the slider 120 locating from the free end 126R toward the fixed end 126F is inserted to the stand 130, the rails 123 of the slider 120 are positioned in the notches 131N respectively. Further, the slider 120 is slidably moved into or out of the stand 130 in the longitudinal direction. That is, the slider 120 is slid out of the stand 130 in the moving-out direction (e.g., the direction indicated by the arrow TU in FIG. 8) and therefore the terminal body 110 is tilted up with respect to the stand 130. Further, the slider 120 is slid into the stand 130 in the moving-in direction (e.g., the direction indicated by the arrow TD in FIG. 8) and therefore the terminal body 110 is tilted down toward the stand 130. That is, the tilting angle of the terminal body 110 is adjusted through the moving-in or moving-out operation of the slider 120 with respect to the stand 130.

The slider cover 132 is disposed in the stand housing 131 and guides the sliding movement of the slider 120. In this embodiment, the slider cover 132 is coupled to the inside of the stand housing 131 and is shaped to cover the slider 120. An inner surface of the slider cover 132 is shaped to be complementary to a shape of an outer surface of the slider 120. Specifically, the slider cover 132 has an approximately rectangular cover plate 132A, and side plates 132B integrated with respective side edges of the cover plate 132A and bent with respect to the cover plate 132A. Thus, the slider cover 132 has an approximately inverted U-like cross-sectional shape. The slider cover 132 is disposed at the inner surface of the stand housing 131 and defines the receiving space 130RS between the slider cover 132 and the stand housing 131. When the terminal body 110 is viewed from the side, the cover plate 132A and the side plates 132B are curved with a curvature corresponding to the curvature of the slider 120. The slider cover 132 has the catching portion 132E formed on its inner surface in the vicinity of an upper end of the slider cover 132. The stoppers 125 of the slider 120 are caught by the catching portion 132E of the slider cover 132, thus preventing the slider 120 from being separated from the stand 130.

The stand cover 133 fixes the slider cover 132 to the stand housing 131. The stand cover 133 has a pair of engaging hooks 133H on an inner surface of the stand cover 133 at a lower end thereof. Further, the stand cover 133 may have coupling pins (not shown), which engage fitting holes (not shown) provided in the inner surface of the stand housing 131, on the inner surface of the stand cover 133 at an upper end thereof.

The communication terminal 100 includes a plurality of rollers which reduce slide resistance of the sliding movement of the slider 120 and support the slider 120 in a direction perpendicular to the movement direction of the slider 120. In the embodiments, when the terminal body 110 is viewed from the side, the slider 120 is in contact with the stand 130 and the slider cover 132 via the rollers at four locations. Specifically, the slider 120 is in contact with and the stand 130 via the rollers at two locations between the lower surface of the slider 120 and the inner surface of the stand housing 131, while the slider 120 is in contact with the slider cover 132 via the rollers at two locations between the upper surface of the slider 120 and the inner surface of the slider cover 132. The contact at the four locations provided by the rollers allows the slider 120 to slide with respect to the stand 130 while being stably retained in the stand 130.

In this embodiment, by way of example of the plurality of rollers, the communication terminal 100 includes a pair of first rollers 141, a pair of second rollers 142, a third roller 143, and a pair of fourth rollers 144. The first rollers 141 are adjacent to the upper end of the slider cover 132 and are rotatably coupled to the cover plate 132A. That is, the first rollers 141 are rotatably coupled to the aforementioned inner upper surface of the stand 130. The first rollers 141 contact the upper surface 127U of the slider 120 and roll along with the movement of the slider 120. The second rollers 142 are located opposite the first rollers 141 and are rotatably coupled to an inner surface of the front portion 131F of the stand housing 131. That is, the second rollers 142 are rotatably coupled to the aforementioned inner lower surface of the stand 130. The second rollers 142 contact the lower surface 127L of the slider 120 (the surfaces of the rails 123 of the slider 120) and roll along with the movement of the slider 120. The third roller 143 is rotatably coupled to the upper surface 127U of the slider 120 in the vicinity of the free end 126R of the slider 120. The third roller 143 contacts the lower surface of the slider cover 132 (the aforementioned inner upper surface of the stand 130) and rolls along with the movement of the slider 120. The fourth rollers 144 are rotatably coupled to the lower surface 127L of the slider 120 in the vicinity of the free end 126R of the slider 120. The fourth rollers 144 contact the inner surface of the stand housing 131 (the aforementioned inner lower surface of the stand 130) and roll along with the movement of the slider 120. In this embodiment, regarding the upper surface of the slider 120, the slider 120 is positioned with respect to the slider cover 132 through the pair of first rollers 141 coupled to the slider cover 132 and the third roller 143 coupled to the slider 120. Further, regarding the lower surface of the slider 120, the slider 120 is positioned with respect to the stand housing 131 through the pair of second rollers 142 coupled to the stand housing 131 and the pair of fourth rollers 144 coupled to the slider 120. Accordingly, the slider 120 is retained in the stand 130 in such a manner that the slider 120 is sandwiched by the first and third rollers 141, 143 and the second and fourth rollers 142, 144. Thus, the slider 120 can be supported by the stand 130 without any play in the direction perpendicular to the movement direction of the slider 120 (e.g., the moving-out direction TU and the moving-in direction TD).

Figure 7:
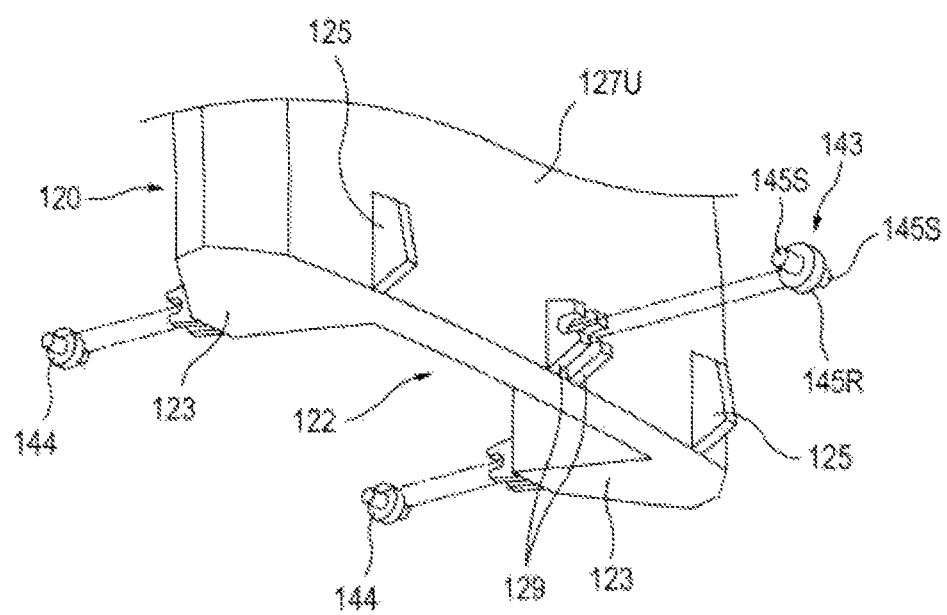
FIG. 7 is an enlarged perspective view showing rollers.

In this embodiment, as shown in FIG. 7, each of the first to fourth rollers 141, 142, 143, and 144 comprises a roller having a rotating shaft 145A and a rolling portion 145R for rolling. The rotating shaft 145A and the rolling portion 145R are integrated together. Further, said roller in which the rotating shaft 145S and the rolling portion 145R are integrated together can be easily mounted on a bracket 129 formed on the slider 120 and the stand 130 by fitting. Alternatively, the rolling portion 145R may be independent from the rotating shaft 145S. In the embodiments of the communication terminal, at least the rolling portions 145R of the first to fourth rollers 141, 142, 143, 144 are made of a material having a superior self-lubricity, i.e. a material that has lower static friction and low kinetic frictions even without supply of a lubricant. By way of example, at least the rolling portions 145R of the first to fourth rollers 141, 142, 143, 144 are made of a plastic material such as polyacetal resin, or an engineering ceramic material such as silicon nitride ($Si_3N_4$) and zirconium oxide ($ZrO_2$). With the above-described configuration and arrangement of the first to fourth rollers 141, 142, 143, 144, the slider 120 can be stably and smoothly slid with respect to the stand 130.

The communication terminal 100 is configured to lock the slider 120 to the stand 130 at various positions (e.g., at as many positions as the number of the engagement portions 121). In this embodiment, the communication terminal 100 comprises: a rotation lever 150 configured to releasably engage one of the engagement portions 121 of the slider 120; and a spring 160 configured to bias the rotation lever 150 toward the slider 120 such that the rotation lever 150 may always engage one of the engagement portions 121 of the slider 120.

The rotation lever 150 is rotatably coupled to the inner surface of the stand housing 131 and is located in the longitudinal groove 122 of the slider 120. The rotation lever 150 has a pair of laterally protruding pivot pins 151 at approximately the midway of the rotating lever 150. A pair of support brackets 131SB to which the pivot pins 151 are fitted respectively are formed on the inner surface of the front portion 131F of the stand housing 131. The pivot pins 151 are fitted to the support brackets 131 SB and the rotation lever 150 is rotatably coupled to the inner surface of the stand housing 131 thereby. When the terminal body 110 is viewed from the side, the rotation lever 150 is curved with a curvature corresponding to the curvature of the slider 120. The rotation lever 150 includes a pair of the pawls 152 at its upper end. The pawls 152 releasably engage one of the engagement portions 121 of the slider 120. Each of the pawls 152 includes a first surface 152ES, which comes into contact with the engagement surface 121ES of the engagement portion 121, and a second surface 152PS, which comes into contact with the wedge surface 121WS of the engagement portion 121. The rotation lever 150 includes the push button 153 at an end opposite to the pawls 152 in the longitudinal direction. The push button 153 protrudes in a direction opposite to the protruding direction of the pawls 152. The push button 153 is located opposite to the pawls 152 with a rotation center of the rotation lever 150 (i.e., the pivot pins 151) between the push button 153 and the pawls 152. That is, the pivot pins 151 are located between the pawls 152 and the push button 153. The push button 153 is exposed out of the stand housing 131 through the opening 134 of the stand housing 131. The above-described rotation lever 150 may be rotated between a locked position where the pawls 152 engage one of the engagement portions 121 to lock the slider 120 to the stand 130 and a unlocked position where the pawls 152 are disengaged from said one of the engagement portions 121 to allow the slider 120 to slidably move with respect to the stand 130. In the locked position, the push button 153 is exposed out of the stand housing 131 through the opening 134 of the stand housing 131. In the unlocked position, the push button 153 is positioned in the stand housing 131 or exposed out of the stand housing 131 at a height less than the protruding height of the push button 153 in the locked position. In this embodiment, the rotation lever 150 is always biased to the locked position by the spring 160.

In this embodiment, the spring 160 comprises a leaf spring bent in a V-like shape. The spring 160 is disposed between the rotation lever 150 and the stand housing 131 and always biases the rotation lever 150 toward the slider 120 (i.e., to the locked position). That is, the spring 160 biases the rotation lever 150 such that the pawls 152 of the rotation lever 150 are engaged with one of the engagement portions 121 of the slider 120. The spring 160 is coupled to the stand housing 131 and the rotation lever 150 in such a manner that one end of the spring 160 comes into contact with the inner surface of the front portion 131F of the stand housing 131 and a portion 161 of two bent portions of the spring 160 facing toward the one end of the spring 160 is fitted to the rotation lever 150. For coupling between the spring 160 and the rotation lever 150, the rotation lever 150 includes a slit 154 located above the pivot pins 151, an inclined surface portion 155 extending from the slit 154, and a pair of grooves 156 formed in the inclined surface portion 155. The portion 161 of the spring 160 is fitted to the grooves 156 in the inclined surface portion 155 through the slit 154 and thereby the portion 161 of the spring 160 is coupled to the rotation lever 150. The spring 160 is coupled to the stand housing 131 and the rotation lever 150 in a state where the spring 160 is compressed to a certain extent. Therefore, the bias force or restoring force of the spring 160 is applied to the rotation lever 150 through the portion 161 of the spring 160 and the inclined surface portion 155. That is, the spring 160 applies the bias force or restoring force to the rotation lever 150 toward the engagement portions 121 between the pawls 152 and the pivot pins 151. Such a bias force or restoring force acts in the rotation lever 150 such that the rotation lever 150 may releasably engage the engagement portions 121 of the slider 120 at the pawls 152. If the rotation lever 150 is rotated to the unlocked position, then the inclined surface portion 155 further compresses the spring 160.

In some embodiments, the spring 160 may comprise a torsional coil spring, a tension coil spring, or a compression coil spring. Such coil springs may be coupled to the stand housing 131 and the rotation lever 150 so as to bias the rotation lever 150 toward the slider 120.

Descriptions are made as to an example of the adjustment of a tilting angle in the communication terminal according to an embodiment with reference to FIGS. 8 to 12.

Figure 8:
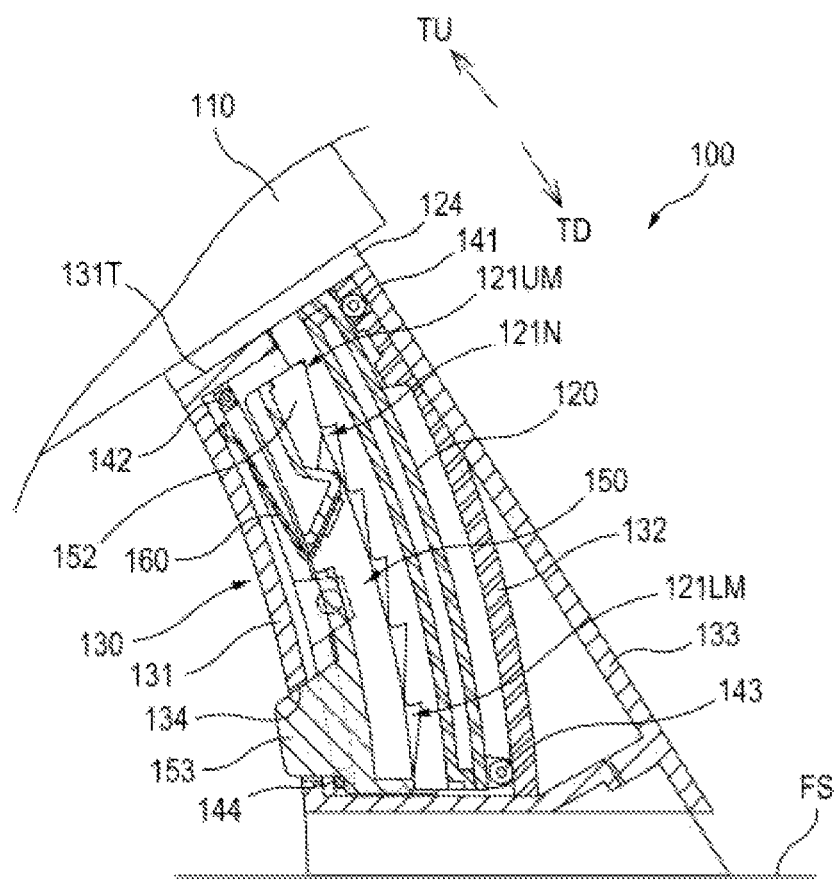
FIGS. 8 to 12 illustrate an example of the adjustment of a tilting angle of a communication terminal according to an embodiment.

Referring to FIG. 8, the terminal body 110 of the communication terminal 100 is tilted at a predetermined tilting angle with respect to the floor surface FS, and the slider 120 is completely inserted into the stand 130. Further, the rotation lever 150 is positioned at the locked position as being biased by the spring 160. The pawl 152 of the rotation lever 150 is engaged with an uppermost engagement portion 121UM among the engagement portions 121 of the slider 120. The push button 153 is exposed out of the stand housing 131 through the opening 134. Further, the flange 124 of the slider 120 is in contact with the top portion 131T of the stand housing 131.

Figure 9:
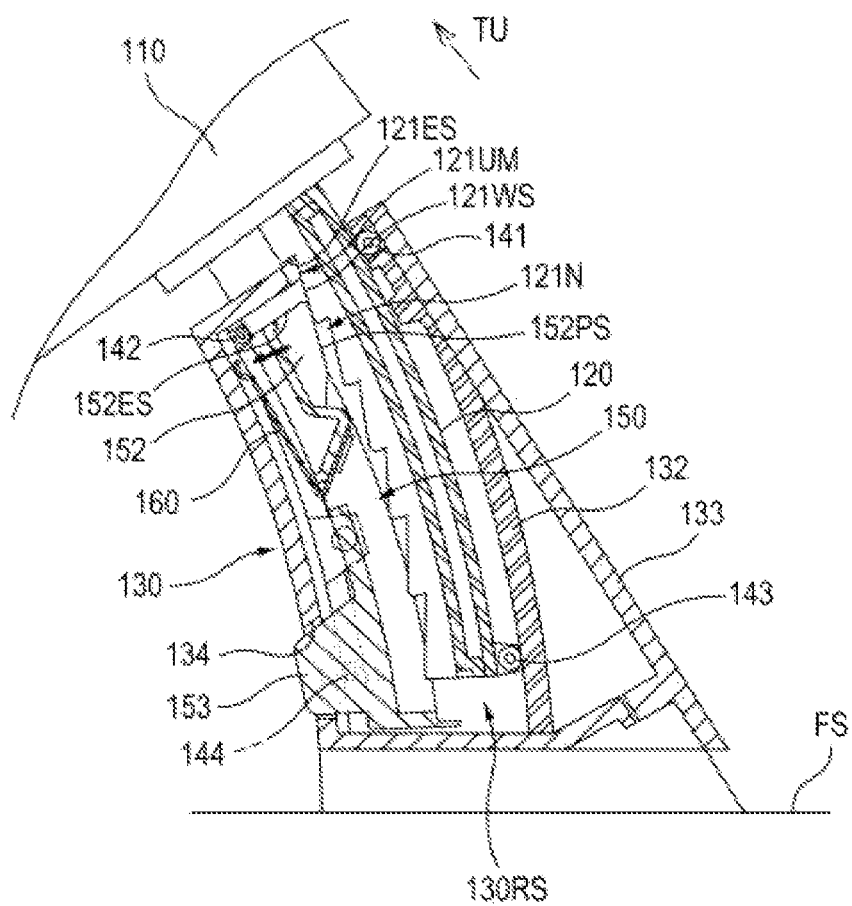
Figure 10:
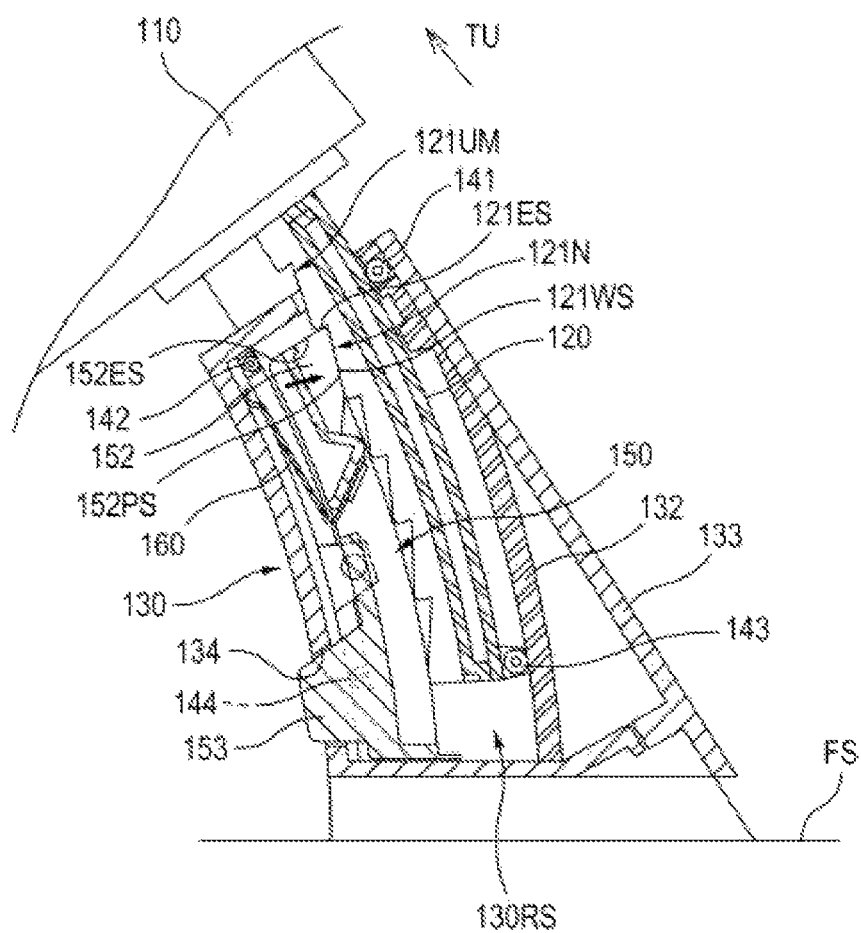

Next, as shown in FIG. 9, if the terminal body 110 is lifted up from the stand 130 by a user, then the slider 120 is slid out of the stand 130 in the moving-out direction TU. As the slider 120 is moved out of the stand 130, the wedge surface 121WS of the uppermost engagement portion 121UM pushes the second surface 152PS of the pawl 152 through the contact between the wedge surface 121WS and the second surface 152PS, while the rotation lever 150 is rotated to the unlocked position against the bias force of the spring 160 due to a reaction against the action of the wedge surface 121WS pushing the second surface 152PS. Subsequently, as shown in FIG. 10, if the pawl 152 passes the uppermost engagement portion 121UM and enters an engagement portion 121N located immediately below the uppermost engagement portion 121UM, then the rotation lever 150 is rotated to the locked position by the bias force of the spring 160 and the pawl 152 engages the engagement portion 121N. Thus, the terminal body 110 is tilted up relative to a lower end of the terminal housing 111 by an angle corresponding to an spacing between the engagement portion 121UM and the engagement portion 121N.

When the terminal body 110 is fixed with respect to the stand 130 as shown in FIG. 10, the terminal body 110 cannot revert to the original position shown in FIG. 8. That is, although the terminal body 110 pushes the slider 120 in the moving-in direction TD due to the weight of the terminal body 110, the slider 120 is locked to the stand 130 and the terminal body 110 is maintained by the locked slider 120 in a state where the terminal body 110 is inclined with respect to the stand 130. This is because the engagement surface 121ES of the engagement portion 121N pushes the first surface 152ES of the pawl 152 in a direction in which the second surface 152PS of the pawl 152 contacts the wedge surface 121WS of the engagement portion 121N.

As the terminal body 110 is further lifted up from the position shown in FIG. 10, the pawl 152 sequentially engages the engagement portions 121. As the pawl 152 engages the respective engagement portions 121, the terminal body 110 is maintained in the tilted-up state with respect to the stand 130 at the tilting angles formed by respective engagements between the pawl 152 and the engagement portions 121. Accordingly, the tilting angle of the terminal body 110 can be adjusted in a stepped manner by virtue of the stepped engagement between the pawl 152 and the engagement portions 121.

Figure 11:
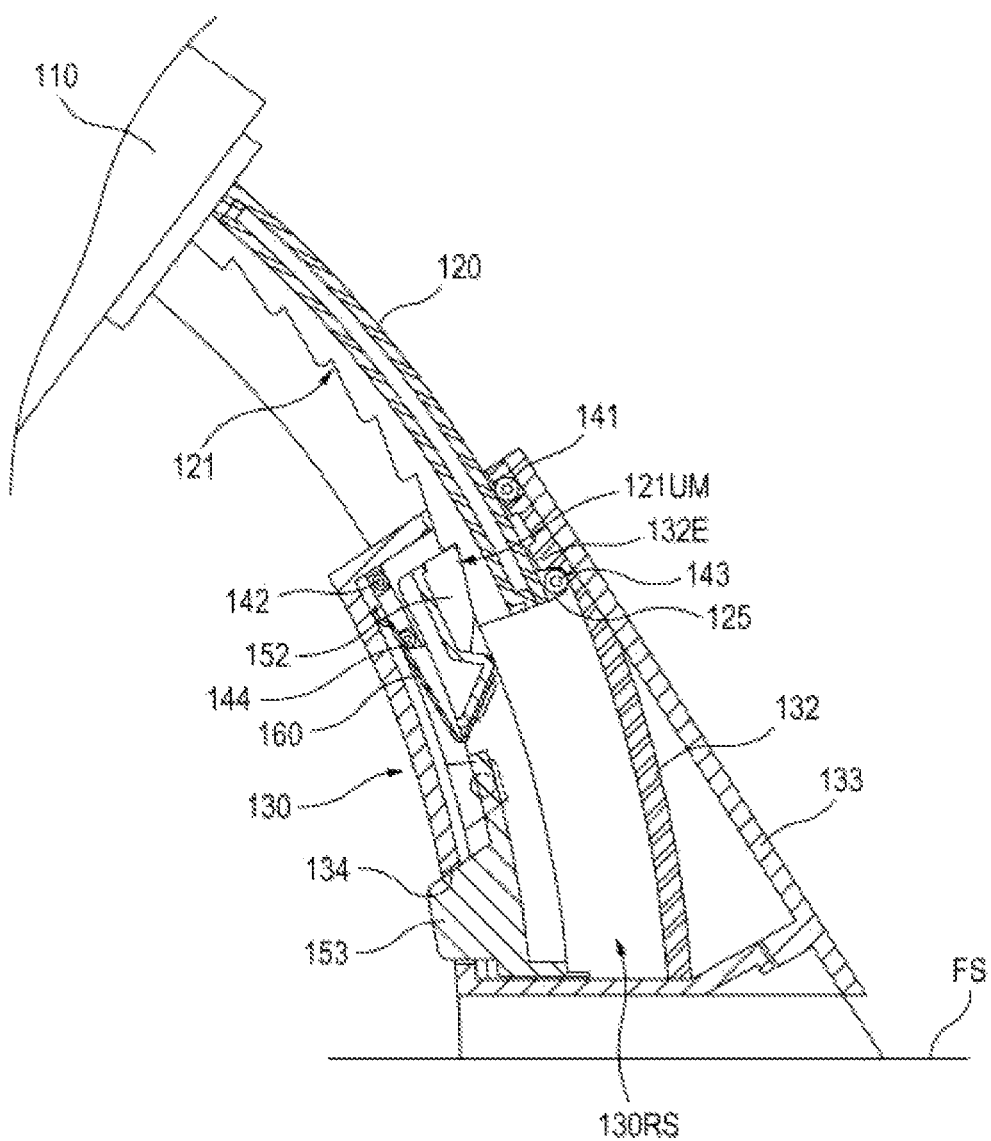

FIG. 11 illustrates that the pawl 152 engages a lowermost engagement portion 121LM and the slider 120 is moved out of the stand 130 to the maximum. Referring to FIG. 11, the stopper 125 of the slider 120 is caught by the catching portion 132E of the slider cover 132 and therefore the slider 120 cannot be separated from the stand 130.

Figure 12:
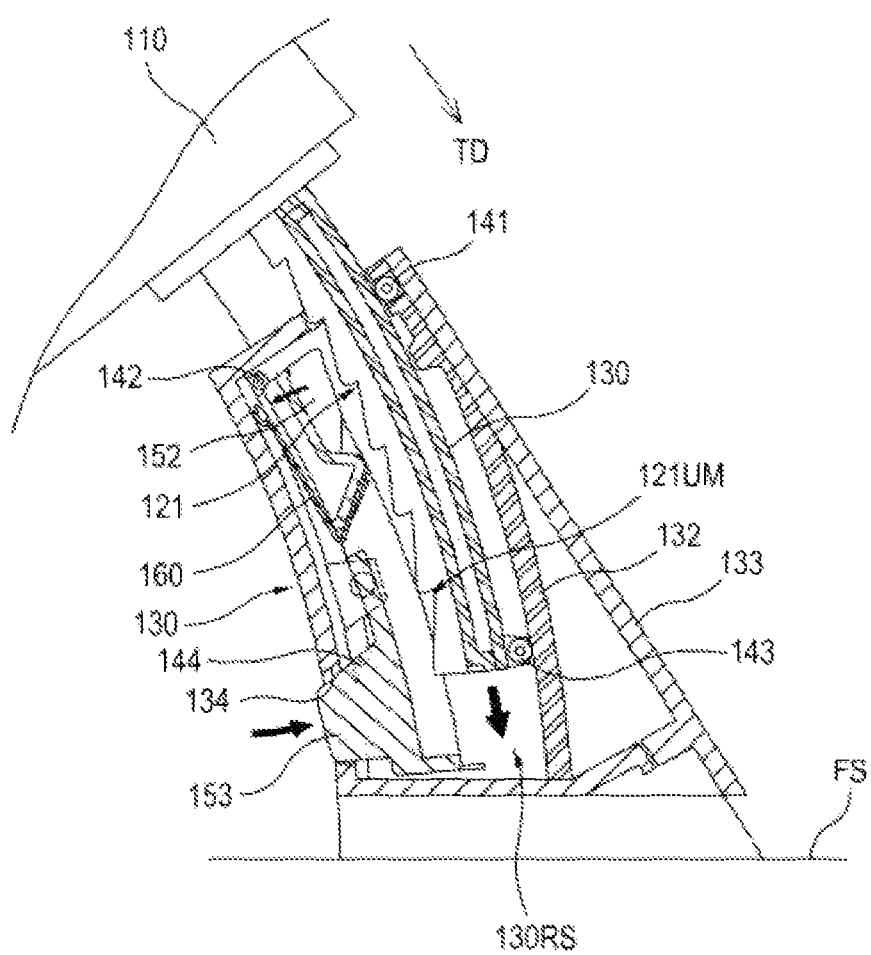

To tilt down the terminal body 110 shown in FIG. 11 toward the stand 130, the push button 153 may be manipulated. For example, as shown in FIG. 12, if the push button 153 is pushed, then the rotation lever 150 is rotated to the unlocked position through a seesaw action. As a result, the engagement between the pawl 152 and the engagement portion 121LM is released and the slider 120 is not subjected to any restraint. Then, the terminal body 110 applies a force to the slider 120 in the moving-in direction TD due to the weight of the terminal body 110, and therefore the slider 120 is inserted into the stand 130 in the moving-in direction TD. If the push button 153 is released from being pushed by the user while the slider 120 is being inserted into the stand 130, then the rotation lever 150 is rotated to the locked position under the bias force of the spring 160 and the pawl 152 engages any one of the engagement portions 121 at that time. That is, the slider 120 is locked to the stand 130 immediately when the push button 153 is released from being pushed by the user. Accordingly, the user can keep the terminal body 110 tilted at a desired tilting angle by manipulating the push button 153.

According to the foregoing embodiments, the terminal body 110 can be positioned with respect to the floor surface FS at various tilting angles by virtue of the engagement between the pawls 152 and the plurality of engagement portions 121. When the slider 120 is locked to the stand 130, the engagement between the pawls 152 and the engagement portions 121 achieves the stable fixation of the terminal body 110. Thus, the terminal body 110 is not allowed to tilt down toward the ground surface due to the weight of the terminal body 110. Further, since the slider 120 are supported through the first to fourth rollers 141, 142, 143, 144 at four locations with respect to the stand 130, the slider 120 is stably supported by the stand 130 and performs smooth sliding movement, thereby facilitating the movement of the slider 120. Further, when the terminal body 110 is tilted down toward the stand 130, the terminal body 110 is tilted down due to the weight of the terminal body 110. Thus, the terminal body 110 provides enhanced user convenience.

Any reference in the specification to "one embodiment," "an embodiment," example embodiment," "illustrative embodiment," etc. means that a particular feature, structure or characteristic described in connection with the embodiment is included in at least one embodiment of the present disclosure. The appearances of such phrases in various places in the specification are not necessarily all referring to the same embodiment. Further, when a particular feature, structure or characteristic is described in connection with any embodiment, it is submitted that it is within the purview of one skilled in the art to affect such feature, structure or characteristic in connection with other embodiments.

Although embodiments have been described with reference to a number of illustrative embodiments thereof, it should be understood that various other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A communication terminal, comprising:
   a terminal body;
   a slider detachably coupled to a rear surface of the terminal body, the slider including a plurality of engagement portions arranged in a longitudinal direction of the slider;
   a stand coupled to the slider which is slidably moved to and from the stand, the stand supporting the terminal body by the slider;
   a rotation lever rotatably coupled to the stand, the rotation lever including a pawl releasably engaging one of the plurality of engagement portions; and
   a spring coupled to the stand and the rotation lever, the spring biasing the rotation level toward the slider such that the pawl of the rotation lever engages one of the plurality of engagement portions,
   wherein the rotation lever includes a locked position where the pawl engages one of the plurality of engagement portions to lock the slider to the stand and an unlocked position where the pawl is separated from the one of plurality of the engagement portions to allow a sliding movement of the slider,
   wherein the rotation lever is rotated between the locked position and the unlocked position,
   wherein each of the plurality of engagement portions includes an engagement surface and a wedge surface,
   wherein the pawl includes a first surface engaging the engagement surface and a second surface contacting with the wedge surface, and wherein when the slider is moved out of the stand, the wedge surface contacts the second surface of the pawl, thereby rotating the rotation lever to the unlocked position.

2. The communication terminal claim 1, wherein the rotation lever includes a push button configured to release the pawl from engagement, the push button being exposed out of the stand.

3. The communication terminal of claim 2, wherein the rotation lever includes a pivot pin rotatably coupled to the stand and located between the pawl and the push button, and
wherein the spring is coupled to the rotation lever between the pawl and the pivot pin and applies a force to the rotation lever toward the plurality of engagement portions.

4. The communication terminal of claim 1, further comprising a first roller, a second roller, a third roller and a fourth roller for facilitating a movement of the slider,
wherein the stand includes an inner upper surface facing toward an upper surface of the slider and an inner lower surface facing toward a lower surface of the slider, and
wherein the first roller is rotatably coupled to the inner upper surface of the stand and contacts the upper surface of the slider, the second roller is rotatably coupled to the inner lower surface of the stand and contacts the lower surface of the slider, the third roller is rotatably coupled to the upper surface of the slider and contacts the inner upper surface of the stand, and the fourth roller is rotatably coupled to the lower surface of the slider and contacts the inner lower surface of the stand.

5. The communication terminal of claim 4, wherein each of the first roller, the second roller, the third roller and the fourth roller includes a rotating shaft and a rolling portion, and the rotation shaft and the rolling portion are integrated together.

6. The communication terminal of claim 4, wherein each of the first roller, the second roller, the third roller and the fourth roller includes a rolling portion for rolling, and the rolling portion is made of a polyacetal resin material or an engineering ceramic material.

7. The communication terminal of claim 1, wherein the slider is curved with a predetermined curvature.

8. The communication terminal of claim 7, wherein the stand includes a stand housing and a slider cover coupled to the stand housing and a receiving space for receiving the slider is defined between the stand housing and the slider cover.

9. The communication terminal of claim 8, wherein the slider includes, on a lower surface of the slider, a pair of rails extending in the longitudinal direction and a longitudinal groove extending between the pair of rails, and
wherein the plurality of engagement portions are formed in the longitudinal groove.

10. The communication terminal of claim 8, wherein the slider includes a stopper for preventing the slider from being separated from the stand, and
wherein the slider cover includes, on a lower surface of the slider cover, a catching portion by which the stopper is caught.

11. The communication terminal of claim 10, wherein the slider is detachably coupled to the terminal body.

12. The communication terminal of claim 1, wherein the plurality of engagement portions are arranged at a predetermined spacing in the longitudinal direction of the slider.

13. The communication terminal of claim 1, wherein the terminal body and the stand are integrated together.

* * * * *